(No Model.)
F. ROURK.
VELOCIPEDE.
No. 384,643.　　　　　　　　　Patented June 19, 1888.
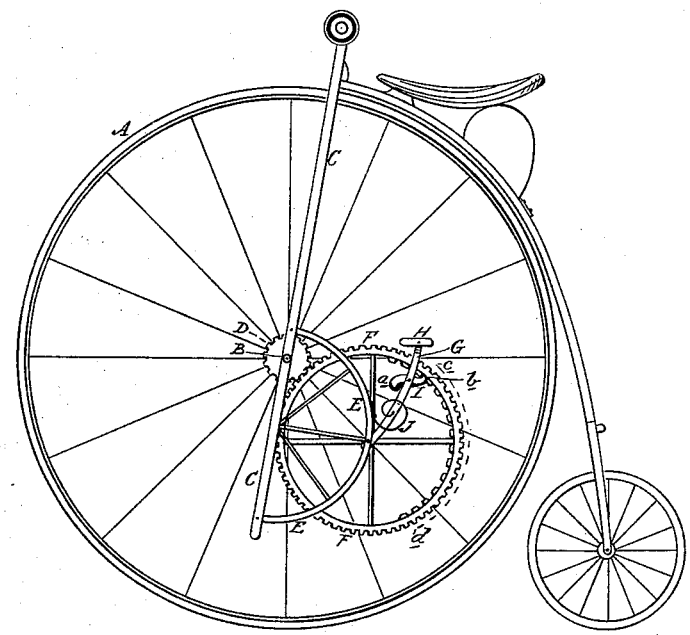
WITNESSES.
J. J. Lively.
M. Beech
INVENTOR
Francis Rourk,
her atty:
Henry Beech.

UNITED STATES PATENT OFFICE.

FRANCIS ROURK, OF LONDON, ONTARIO, CANADA.

VELOCIPEDE.

SPECIFICATION forming part of Letters Patent No. 384,643, dated June 19, 1888.

Application filed July 23, 1887. Serial No. 245,143. (No model.)

*To all whom it may concern:*

Be it known that I, FRANCIS ROURK, a subject of the Queen of Great Britain, residing at London, in the county of Middlesex and Province of Ontario, Dominion of Canada, have invented certain new and useful Improvements in Cycles and Velocipedes; and I do hereby declare that the following is a full, clear, and exact description of the same.

My invention relates to improvements in cycles and velocipedes of all descriptions, the object being to prevent loss of power in the pedal passing a center; and it consists in the construction and combination of devices hereinafter described and claimed.

The accompanying side elevation of a bicycle with my attachment illustrates my invention.

A is the front traction-wheel of a bicycle; B, the axle, and C the fork.

D is a pinion centered on axle B, which revolves with it.

E is an arm or bracket extending from the fork and strongly braced thereto. F is a spur-wheel pivoted on this arm or bracket E, the cogs or teeth on the outer rim of which engage with the pinion D.

G is a bar or rod pivoted to arm E and carrying the pedal H.

I is a pawl or block attached to the bar G by a pin or bolt passing through both, so as to leave the pawl free to oscillate up and down on its center. One end, *a*, of this pawl is weighted or controlled by a spring, so that when at rest the other end, *b*, will be thrown up. When the pedal H is pressed down by the rider's foot, the upper end of the bar G is also depressed and the pawl I is carried down with it, so that the end *b* is pressed tightly against the rim of the spur-wheel and causes the latter to partially revolve, either by the downward pressure of the end of the pawl against it or by the engagement of the said pawl with the teeth on the inside of the spur-wheel, as shown in drawing, or on the outside when the pawl is sufficiently prolonged. This pressure is continued from about the point marked *c* down to *d*, in arc of dotted lines in drawing, and thus all loss of power in passing a center is prevented, as the arc of the spur-wheel over which the pressure of the pawl is exerted covers only the arc of the freest movement.

J is a spring, one end of which is attached to the arm or bracket E and the other to the bar G, and as soon as the rider's foot is raised after completing the downstroke of the pedal this spring brings the bar G back to its normal upright position, and with it the pedal and pawl thereto attached, the weighted end *a* of pawl raising the other end, *b*, and freeing it from contact with the spur-wheel in this upward motion. A pin, stud, or shoulder and bar G above the pawl prevent its end *b* from rising too high, and a similar contrivance beneath the pawl acts as a bearing to it in the downstroke and prevents it from dropping too low.

I claim as my invention—

The combination, with the wheel A, axle B, having a pinion, D, and the fork C, extended below the axle, of the bracket E, supported by the fork, an externally and internally cogged spur-wheel, F, journaled in said bracket, an upward-projecting bar, G, pivoted to the bracket and carrying a pedal, H, and pawl I, and a spring, J, having one end attached to the bracket E and the other end to the bar G, substantially as described.

FRANCIS ROURK. [L. S.]

Witnesses:
 JNO. B. GIVINS,
 HENRY BEECH.